(12) United States Patent
Yamashita et al.

(10) Patent No.: US 7,530,719 B2
(45) Date of Patent: May 12, 2009

(54) LIGHT SOURCE DEVICE AND LIGHT DEFLECTION ELEMENT

(76) Inventors: Tomoyoshi Yamashita, c/o Tokyo Technology and Information Center, Mitsubishi Rayon Co., Ltd. 3816, Noborito, Tama-ku, Kawasaki-shi, Kanagawa 2140014 (JP); Masae Ono, c/o Tokyo Technology and Information Center, Mitsubishi Rayon Co., Ltd. 3816, Noborito, Tama-ku, Kawasaki-shi, Kanagawa 2140014 (JP)

(*) Notice: Subject to any disclaimer, the term of this patent is extended or adjusted under 35 U.S.C. 154(b) by 229 days.

(21) Appl. No.: 10/564,961

(22) PCT Filed: Jul. 12, 2004

(86) PCT No.: PCT/JP2004/009934
§ 371 (c)(1),
(2), (4) Date: Sep. 28, 2006

(87) PCT Pub. No.: WO2005/005881
PCT Pub. Date: Jan. 20, 2005

(65) Prior Publication Data
US 2007/0053206 A1   Mar. 8, 2007

(30) Foreign Application Priority Data
Jul. 15, 2003   (JP) .............................. 2003-274733

(51) Int. Cl.
*F21V 7/04* (2006.01)
(52) U.S. Cl. ........................ 362/600; 362/620; 362/626
(58) Field of Classification Search .......... 362/600–630
See application file for complete search history.

(56) References Cited

U.S. PATENT DOCUMENTS

| | | | | |
|---|---|---|---|---|
| 4,984,144 A | * | 1/1991 | Cobb et al. | 362/339 |
| 6,502,947 B2 | * | 1/2003 | Matsumoto et al. | 362/626 |
| 7,220,038 B2 | * | 5/2007 | Yamashita et al. | 362/606 |

FOREIGN PATENT DOCUMENTS

| | | |
|---|---|---|
| JP | 63-298902 | 12/1988 |
| JP | 2-17 | 1/1990 |
| JP | 2-84618 | 3/1990 |
| JP | 7-288552 | 10/1995 |
| JP | A-09-005505 | 1/1997 |
| JP | 9-105804 | 4/1997 |
| JP | 9-507584 | 7/1997 |
| JP | 11-38209 | 2/1999 |
| JP | 2000-35763 | 2/2000 |
| JP | A-2001-312914 | 11/2001 |
| JP | 2002-197908 | 7/2002 |

* cited by examiner

*Primary Examiner*—Anabel M Ton
(74) *Attorney, Agent, or Firm*—Morgan Lewis & Bockius LLP

(57) ABSTRACT

[The present invention provides] a light source device comprising: a light conductor which has a first light incident end surface, a second light incident end surface and a light emitting surface; a first primary light source and a second primary light source which are disposed respectively adjacent to the first light incident end surface and second light incident end surface; and a light deflecting element which has a light incident surface disposed facing the light emitting surface and a light emitting surface, wherein a directional light emitting functional part with an average inclination angle of 0.5 to 15° is formed on at least one surface of the light conductor, i.e., the light emitting surface or back surface, a plurality of mutually parallel prism rows extending in a direction parallel to the first light incident end surface and second light incident end surface are formed on the light incident surface of the light deflecting element, [each of these] prism rows has a first prism surface on the side close to the first primary light source and a second prism surface on the side close to the second primary light source, the first prism surface has a first region and a second region that extend in the direction of extension of the prism rows, the vertical angle of the prism rows is 80 to 120°, the difference in the angle of inclination between the first region and second region is 5 to 20°, and the second region has a smaller angle of inclination than the first region.

28 Claims, 12 Drawing Sheets

LIGHT SOURCE DEVICE AND LIGHT DEFLECTION ELEMENT

TECHNICAL FIELD

The present invention relates to an edge lighting type light source device constituting a display device such as a liquid crystal display device, and a light deflecting element used in this light source device, and more particularly relates to a light source device which is constructed so as to be especially suited for the observation of display images from two or more different directions by causing the emission of light with directionality in these two or more mutually different directions, and a light deflecting element used in this light source device.

BACKGROUND ART

In recent years, color liquid crystal display devices have been widely used in various fields such as monitors for portable notebook personal computers, [desktop] personal computers, and the like, or as display parts for liquid crystal television sets, video-integrated type liquid crystal television sets, portable telephones, portable information terminals, and the like. Furthermore, with the increase in the amount of information processed, the diversification of needs, the need to handle multimedia, and the like, there has been an active pursuit of increased screen size and higher definition in liquid crystal display devices.

Liquid crystal display devices are basically constructed from a back lighting part and a liquid crystal display element part. In the back lighting part, from the standpoint of compactness of the liquid crystal display device, an edge lighting system in which the primary light source is disposed so as to face the side end surface of the light conductor has been widely used.

Incidentally, in recent years, in liquid crystal display devices and the like, a high-brightness light source device in which the utilization efficiency of the light is increased in order to achieve effective utilization of the quantity of light that is emitted from the primary light source has been utilized in portable notebook personal computers, portable telephones, portable information terminals, and the like as an edge lighting type back lighting part from the standpoint of reducing power consumption.

For example, light source devices in which a lens surface in which numerous lens units are formed, or a pearskin finished surface, is formed on at least the light emitting surface of the light conductor or the back surface, and a prism sheet is carried on the light emitting surface, have been proposed in Japanese Patent Application Laid-Open No. H2-17 (Patent Reference 1) and Japanese Patent Application Laid-Open No. H2-84618 (Patent Reference 2). However, in such light source devices, although a relatively high brightness is obtained, such devices are still unsatisfactory in terms of the uniformity of the brightness at the light emitting surface. Accordingly, for the purpose of achieving a uniform brightness at the light emitting surface, a light source device in which the average inclination angle of the lens surface or pearskin finished surface formed on the light conductor is set at 0.5 to 7.5° has been proposed in Japanese Patent Application Laid-Open No. H7-288552 (Patent Reference 3) and the like. In such a light source device, however, although the uniformity of the brightness is improved, and a relatively high brightness is obtained as described in Patent References 1 and 2 above, sufficiently satisfactory results are not obtained from the standpoint of achieving a high brightness.

Furthermore, the formation of the prism surfaces of a prism row constituting a prism sheet into a convex surface shape in order to heighten the focusing and directionality of light, and thus to concentrate and emit the light in a relatively narrow range, etc., when the light emitted from the light conductor is deflected using a prism sheet, has been proposed in Japanese Patent Publication No. H9-507584 (Patent Reference 4), Japanese Patent Application Laid-Open No. H9-105804 (Patent Reference 5), Japanese Patent Application Laid-Open No. H11-38209 (Patent Reference 6) and Japanese Patent Application Laid-Open No. 2000-35763 (Patent Reference 7). However, these prism sheets concentrate the emitted light in a single direction (substantially in the normal direction) as much as possible before emitting this light, and do not cause the emission of light with directionality in two or more different directions.

Moreover, the construction of the prism surfaces of the prism row constituting a prism sheet from a plurality of flat surfaces for the same purpose as in Patent References 4 through 7 mentioned above has been proposed in Japanese Patent Application Laid-Open No. S63-298902 (Patent Reference 8) and Japanese Patent Application Laid-Open No. 2002-197908 (Patent Reference 9). However, in these prism sheets as well, the emitted light is concentrated and emitted as much as possible in a single direction (substantially in the normal direction), and light cannot be emitted with directionality in two or more mutually different directions.

In recent years, there has been a demand for liquid crystal display devices that cause the emission of light with directionality in at least two mutually different directions, especially at least three mutually different directions, while promoting a reduction in power consumption. The vehicle-mounted display device of a car navigation system may be cited as an example of such a liquid crystal display device. Such a vehicle-mounted display device can be used not only as an image display for a car navigation system, but also as the image display for a television or the like. Accordingly, since there may also be cases in which passengers sitting in the rear seat view the display images in addition to the driver and the passenger sitting in the front passenger seat, a display with the brightness required to be seen by the driver, passenger in the front passenger seat and passengers in the rear passenger seat must be accomplished using the limited power supply obtained by a vehicle-mounted battery. This vehicle-mounted display device is generally disposed between the driver's seat and the front passenger seat so that the display screen is perpendicular to the direction of advance of the vehicle. Accordingly, a directionality in two directions forming an angle of approximately 25 to 35° on mutually opposite sides with respect to the normal direction of the display screen is required for the driver and the passenger in the front passenger seat, and a directionality substantially in the normal direction of the display screen is required for the passengers in the rear seat.

However, in the light source devices described in Patent References 4 through 9, the emitted light is emitted with a high directionality in only one specified direction (e.g., substantially in the normal direction of the display screen); accordingly, in other directions, the brightness shows an extreme drop, so that these devices have not been suitable for use as light source devices in vehicle-mounted display devices.

Furthermore, display devices for game machines or the like that can be played by or observed by at least two players or observers in at least two positions determined beforehand with respect to the display screen are indicated as examples of such display devices in which directionality in two or more directions is required.

Patent Reference 1: Japanese Patent Application Laid-Open No. H2-17
Patent Reference 2: Japanese Patent Application Laid-Open No. H2-84618
Patent Reference 3: Japanese Patent Application Laid-Open No. H7-288552
Patent Reference 4: Japanese Patent Application Publication No. H9-507584
Patent Reference 5: Japanese Patent Application Laid-Open No. H9-105804
Patent Reference 6: Japanese Patent Application Laid-Open No. H11-38209
Patent Reference 7: Japanese Patent Application Laid-Open No. 2000-35763
Patent Reference 8: Japanese Patent Application Laid-Open No. S63-298902
Patent Reference 9: Japanese Patent Application Laid-Open No. 2002-197908

DISCLOSURE OF THE INVENTION

Problems to be Solved by the Invention

Accordingly, it is an object of the present invention to provide a light source device which is constructed so that this light source device is especially suitable for the observation of favorable display images from two or more directions with low power consumption as a result of emitting light with a directionality in two or more mutually different directions, and a light deflecting element that is suitable for use with this light source device.

Means for Solving the Problems

The light source device of the present invention is a light source device comprising: a light conductor which has a first light incident end surface and a second light incident end surface that extend in substantially parallel directions relative to each other and that are positioned on mutually opposite sides, and a light emitting surface; a first primary light source and a second primary light source which are disposed respectively adjacent to the above-mentioned first light incident end surface and the above-mentioned second light incident end surface; and a light deflecting element which has a light incident surface disposed facing the above-mentioned light emitting surface and a light emitting surface positioned on the side opposite from this light incident surface, wherein a directional light emitting functional part with an average inclination angle of 0.5 to 15° is formed on at least one surface of the above-mentioned light conductor, i.e., the light emitting surface or the back surface positioned on the side opposite from this light emitting surface, a plurality of mutually parallel prism rows that extend in a direction substantially parallel to the above-mentioned first light incident end surface and the above-mentioned second light incident end surface are formed on the above-mentioned light incident surface of the above-mentioned light deflecting element, each of these prism rows has a first prism surface on the side close to the above-mentioned first primary light source and a second prism surface on the side close to the above-mentioned second primary light source, the above-mentioned first prism surface has a first region that extends in the direction of extension of the above-mentioned prism rows and a second region that extends in the direction of extension of the above-mentioned prism rows, the vertical angle of the prism rows is 80 to 120°, the difference in the angle of inclination between the above-mentioned first region and the above-mentioned second region is 5 to 20°, and the second region has a smaller angle of inclination with respect to the normal of the prism row formation plane than the above-mentioned first region.

Furthermore, the light source device of the present invention is a light source device comprising: a light conductor which has a light incident end surface that is one of two end surfaces extending in substantially parallel directions relative to each other and positioned on mutually opposite sides, and a light emitting surface; a primary light source which is disposed adjacent to this light incident end surface; and a light deflecting element which has a light incident surface disposed facing the above-mentioned light emitting surface and a light emitting surface positioned on the side opposite from this light incident surface, wherein a directional light emitting functional part with an average inclination angle of 0.5 to 15° is formed on at least one surface of the above-mentioned light conductor, i.e., the light emitting surface or the back surface positioned on the side opposite from this light emitting surface, a plurality of mutually parallel prism rows that extend in a direction substantially parallel to the above-mentioned light incident end surface are formed on the light incident surface of the above-mentioned light deflecting element, each of these prism rows has a first prism surface on the side close to the above-mentioned primary light source and a second prism surface on the side distant from the above-mentioned primary light source, the above-mentioned first prism surface has a first region which extends in the direction of extension of the above-mentioned prism rows and a second region which extends in the direction of extension of the above-mentioned prism rows, the vertical angle of the above-mentioned prism rows is 50 to 90°, the difference in the angle of inclination between the above-mentioned first region and the above-mentioned second region is 10 to 25°, and the above-mentioned second region has a smaller angle of inclination with respect to the normal direction of the prism row formation plane than the above-mentioned first region.

Furthermore, the light deflecting element of the present invention is a light deflecting element that is used in the light source device described above, wherein in concrete terms, a plurality of mutually parallel prism rows which extend in a direction substantially parallel to the above-mentioned first light incident end surface and the above-mentioned second light incident end surface are formed on the light incident surface, each of these prism rows has a first prism surface and a second prism surface, the above-mentioned first prism surface has a first region that extends in the direction of extension of the above-mentioned prism rows and a second region that extends in the direction of extension of the above-mentioned prism rows, the vertical angle of the above-mentioned prism rows is 80 to 120°, the difference in the angle of inclination between the above-mentioned first region and the above-mentioned second region is 5 to 20°, and the above-mentioned second region has a smaller angle of inclination with respect to the normal direction of the prism row formation plane than the above-mentioned first region, or wherein a plurality of mutually parallel prism rows which extend in a direction substantially parallel to the above-mentioned first light incident end surface are formed on the light incident surface, each of these prism rows has a first prism surface and a second prism surface, the above-mentioned first prism surface has a first region that extends in the direction of extension of the above-mentioned prism rows and a second region that extends in the direction of extension of the above-mentioned prism rows, the vertical angle of the above-mentioned prism rows is 50 to 90°, the difference in the angle of inclination between the above-mentioned first region and the above-mentioned second region is 10 to 25°, and the above-mentioned second region has a smaller angle of inclination with respect to the normal direction of the prism row formation plane than the above-mentioned first region.

Effect of the Invention

In the present invention, a directional light emitting functional part having an average inclination angle of 0.5 to 15° is formed on at least one surface of the light conductor, i.e., the light emitting surface or the back surface positioned on the side opposite from this light emitting surface, the first prism surface of [each of] the prism rows of the light deflecting element is constructed from a first region and a second region, the vertical angle of the prism rows is set at 80 to 120°, the difference in angle of inclination between the first region and the second region is set at 5 to 20°, and the angle of inclination of the second region is made smaller than that of the first region. Consequently, light can be emitted with directionality in two or more different directions, and the observation of favorable display images can be accomplished from two or more directions with low power consumption.

BEST MODE FOR CARRYING OUT THE INVENTION

Working configurations of the present invention will be described below with reference to the figures.

FIG. 1 is a model perspective view showing one working configuration of the light source device of the present invention. As is shown in FIG. 1, the light source device of the present invention is constructed from a light conductor 3 in which two side end surfaces that extend parallel to each other in the Y direction and that are positioned on mutually opposite sides are taken as light incident end surfaces 31, and one surface (main surface) that is substantially perpendicular to these is taken as a light emitting surface 33, two primary light sources 1 which are disposed respectively adjacent to the two light incident end surfaces 31 of this light conductor 3, and which are respectively covered by light source reflectors 2, a light deflecting element 4 which is disposed adjacent to the light emitting surface of the light conductor 3, a light reflecting element 5 which is disposed adjacent to the back surface 34 of the light conductor 3 on the side opposite from the light emitting surface 33, and a light diffusing element 6 which is disposed on the light deflecting element 4. Furthermore, in the present working configuration, a light diffusing element 6 was disposed on the light deflecting element 4; however, it would also be possible to use a construction in which this light diffusing element 6 can be disposed as necessary, so that no light diffusing element 6 may be disposed.

The light conductor 3 is disposed parallel to the XY plane, and has a rectangular plate-form shape overall. The light conductor 3 has four side end surfaces; among these, the pair of side end surfaces parallel to the YZ plane are taken as light incident end surfaces 31. The side end surface 31 positioned on the right side in FIG. 1 is the first light incident end surface, and the side end surface 31 positioned on the left side in FIG. 1 is the second light incident end surface. Primary light sources 1 are disposed for the respective light incident end surfaces 31, and the light emitted from the primary light sources 1 is caused to be incident on the respective light incident end surfaces 31, and is introduced into the light conductor 3. The primary light source 1 positioned on the right side in FIG. 1 is the first primary light source, and the primary light source 1 positioned on the left side in FIG. 1 is the second primary light source.

The two main surfaces that are substantially perpendicular to the light incident end surfaces 31 of the light conductor 3 are respectively positioned substantially parallel to the XY plane, and one of these surfaces (the upper surface in the figure) constitutes a light emitting surface 33. A directional light emitting functional part consisting of a lens surface in which numerous lens rows such as rough surfaces, prism rows, lenticular lens rows, V-shaped grooves, or the like are formed substantially parallel to the light incident end surfaces 31 is applied to at least one of these surfaces, i.e., the light emitting surface 33 or the back surface 34 thereof, so that light with a directionality in the luminosity distribution of the emitted light in the plane (XZ plane) perpendicular to the light incident end surfaces 31 and light emitting surface 33 is emitted from the light emitting surface 33 while conducting the light that is incident from the light incident end surfaces 31 through the light conductor 3.

In the rough surfaces and lens rows formed as directional light emitting functional parts on the surface of the light conductor 3, it is desirable that the average inclination angle θa according to ISO4287/1-1984 be set in the range of 0.5 to 15° because this makes it possible to cause the emission of light having the directionality described above, and because this makes it possible to increase the brightness balance within the light emitting surface 33. The average inclination angle θa is more preferably in the range of 1 to 12°, and is even more preferably in the range of 1.5 to 11°. With regard to this average inclination angle θa, it is desirable that the optimal range be set in accordance with the ratio (L/t) of the length (L) in the direction of propagation of the incident light to the thickness (t) of the light conductor 3. Specifically, in cases where a light conductor with an L/t value of approximately 20 to 200 is used as the light conductor 3, the average inclination angle θa is preferably set at 0.5 to 10°, and is even more preferably in the range of 1 to 9°. Furthermore, in cases where a light conductor with an L/t value of approximately 20 or less is used as the light conductor 3, the average inclination angle θa is preferably set at 7 to 12°, and is even more preferably in the range of 8 to 11°.

Thus, by forming a directional [light] emitting functional part with an average inclination angle θa of 0.5 to 15° on the light emitting surface 33 or back surface 34 of the light conductor 3, it is possible to cause the emission of light with emission characteristics having a high directionality such that the angle of the peak light in the emitted light luminosity distribution (in the XZ plane) of the light emitted from the light emitting surface, i.e., the peak angle, shows respective angles a in the range of 10 to 40° on the left and right (i.e. on mutually opposite sides) with respect to the normal of the light emitting surface, and such that the full width at half maximum of the emitted light luminosity distribution (in the XZ plane) is 10 to 50°, from the light conductor 3 in the two directions, i.e., left and right, symmetrical with respect to the normal of the light emitting surface. This emission direction can be efficiently deflected in two or more desired directions by a light deflecting element 4 constructed as described later, so that a light source device which has a high brightness and which has directionality in these directions can be provided.

Here, the angles a are angles formed by the peak direction of the emitted light luminosity distribution in the XZ plane and the light emitting surface 33. These angles a are preferably set at 10 to 40°, more preferably set at 15 to 16° [sic], and even more preferably set at 20 to 30°. Furthermore, the full width at half maximum of the emitted light luminosity distribution is preferably set at 10 to 50°, more preferably set at 15 to 47°, and even more preferably set at 20 to The average inclination angle θa of the rough surface formed on the light conductor 3 can be determined by measuring the rough surface shape using a contact stylus type surface roughness gauge in accordance with ISO4287/1-1984, setting the coordinate in the measurement direction as x, and then [determining the angle] from the obtained inclination function f(x) using the following equation (1) and equation (2).

[Numerical Expression 1]

$$\Delta a = (1/L) \int_0^L |(d/dx)f(x)| dx \quad (1)$$

$$\theta a = \tan^{-1}(\Delta a) \quad (2)$$

Here, L is the measured length, and $\Delta a$ is the tangent of the average inclination angle $\theta a$.

Furthermore, a member with a light emission rate in the range of 0.5 to 5% is desirable as the light conductor 3; [this rate is] even more preferably in the range of 1 to 3%. The reason for this is as follows: namely, when the light emission rate is smaller than 0.5%, the quantity of light that is emitted from the light conductor 3 is reduced, so that a sufficient brightness tends not to be obtained. [On the other hand,] when the light emission rate is greater than 5%, a large quantity of light is emitted in the vicinity of the primary light sources 1, so that the attenuation of light in the X direction of the light emitting surface 33 becomes conspicuous, and the brightness balance in the light emitting surface 33 tends to drop.

In the present invention, the light emission rate from the light conductor 3 is defined as follows. The relationship between the light intensity ($I_0$) of the emitted light at the end edge of the light incident end surface 31 of the light emitting surface 33 and the emitted light intensity (I) at a position located at a distance L from the end edge on the side of the light incident end surface 31 in a case where only one primary light source 1 is lit satisfies the relationship shown by the following equation (3), where t is the thickness (dimension in the Z direction) of the light conductor 3.

[Numerical Expression 2]

$$I = I_0 \cdot \alpha (1-\alpha)^{L/t} \quad (3)$$

Here, the constant $\alpha$ is the light emission rate, and indicates the proportion (%) of the light emitted from the light conductor 3 per unit length in the X direction (length corresponding to the thickness t of the light conductor) perpendicular to the light incident end surface 31 in the light emitting surface 33. This light emission rate a can be determined by taking the logarithm of the light intensity of the emitted light from the light emitting surface 33 on the vertical axis, taking (L/t) on the horizontal axis, plotting the relationship of these values, and determining [the light emission rate] from the slope.

Furthermore, on the other main surface to which no directional light emission functional part is applied, it is desirable to form lens surfaces in which numerous lens rows extending in the direction (X direction) that is substantially perpendicular to the light incident end surfaces 31 in order to control the directionality of the light emitted from the light conductor 3 in the plane (YZ plane) parallel to the light incident end surfaces 31. In the working configuration shown in FIG. 1, a rough surface is formed in the light emitting surface 33, and a lens surface consisting of an array of numerous lens rows extending in the direction (X direction) substantially perpendicular to the light incident end surfaces 31 is formed on the back surface 34. In the present invention, conversely from the configuration shown in FIG. 1, a lens surface may be formed on the light emitting surface 33, and the back surface 34 may be formed as a rough surface.

In cases where lens rows extending in the direction (substantially the X direction) that is substantially perpendicular to the light incident end surfaces 31 are formed on the back surface 34 or light emitting surface 33 of the light conductor 3 as indicated in FIG. 1, examples of lens rows [that can be formed] include prism rows, lenticular lens rows, V-shape grooves, and the like; it is desirable that the YZ cross-sectional shape be set substantially as a triangular prism row.

In the present invention, in cases where the prism rows are formed as lens rows extending substantially in the X direction that are formed on the light conductor 3, it is desirable that the vertical angle of the prism rows be set in the range of 70 to 150°. The reason for this is that setting the vertical angle in this range makes it possible to focus the emitted light from the light conductor 3, so that the brightness of the light source device can be increased. Specifically, by setting the prism vertical angle in this range, it is possible to cause the emission of focused emitted light in which the full width at half maximum of the emitted light luminosity distribution is 35 to 65° in the plane (YZ plane) perpendicular to the XZ plane containing the peak light in the emitted light luminosity distribution (in the XZ plane), so that the brightness of the light source device can be increased. Furthermore, in cases where the prism rows are formed on the light emitting surface 33, it is desirable to set the vertical angle in the range of 80 to 100°, while in cases where the prism rows are formed on the back surface 34, it is desirable to set the vertical angle in the range of 70 to 80° or in the range of 100 to 150°.

Moreover, in the present invention, light diffusing fine particles may be admixed and dispersed in the interior of the light conductor. In addition, the shape of the light conductor 3 is not limited to the shape shown in FIG. 1; light conductors of various cross-sectional shapes such as a shape of a ship may be used. For instance, as is shown in FIG. 2, one example that can be cited is a light conductor in which the back surface 34 is bent, and the thickness gradually decreases from the light incident end surfaces 31 to the central part in the XZ cross-sectional shape. By using such a shape, the emission rate of the light that is emitted from the light emitting surface 33 can be increased.

FIG. 3 is an explanatory diagram of the prism row shape of the light deflecting element 4 constituting one working configuration of the present invention. This light deflecting element 4 uses one main surface as a light incident surface 41, and uses the other main surface as a light emitting surface 42. Numerous prism rows are arranged substantially side by side on the light incident surface 41, and are disposed on the light emitting surface 33 of the light conductor 3 so that the direction of extension of the prism rows is substantially parallel to the light incident end surfaces 31 of the light conductor 3. Each of the prism rows has two prism surfaces, i.e., a first prism surface 411 which is positioned on the side close to the first primary light source and a second prism surface 412 which is positioned on the side close to the second primary light source. The first prism surface 411 extends in the Y direction, and is constructed from a first region 4111 and a second region 4112 that respectively consist of single planes and that have mutually different inclination angles. The first region 4111 is a region that is close to the top part of the prism row, while the second region 4112 is a region that is connected to the first region 4111 and that is positioned further from the top part of the prism row than the first region 4111. In the present invention, furthermore, the inclination angles of surfaces such as planes refer to the inclination angles of surfaces such as planes with respect to the prism row formation plane 43 corresponding to the bottom surface of [each] prism row.

The inclination angle $\alpha$ of the first region 4111, the inclination angle $\alpha'$ of the second region 4112, and the inclination angle $\beta$ of the second prism surface 412 are formed with respect to the direction perpendicular to the prism row formation plane 43 (hereafter referred to as the "normal direction of the prism row formation plane"). The prism row vertical angle (α+β, prism vertical angle) is preferably 80 to 120°, and is even more preferably 80 to 110°. In cases where the prism vertical angle is less than 80°, it tends to become difficult to obtain emitted light directionality in a direction that differs from the normal direction of the prism row formation plane by a required angle. In case where the prism vertical angle exceeds 120°, it tends to become difficult to obtain a sufficient brightness. It is desirable that the angles α and β of the prism vertical angle that are distributed on the left and right with respect to the normal direction of the prism row formation plane be set at 40 to 60°, and preferably set at 40 to 55°. Furthermore, the difference in inclination angle between the first region 4111 and second region 4112 (α-α') is preferably 5 to 20°, more preferably 7 to 17°, and even more preferably 10 to 15°. In cases where this difference in inclination angle (α-α') is less than 5° or exceeds 20°, it tends to become difficult to cause the emission of light having a directionality in a direction that differs from the normal direction of the prism row formation plane by a required angle.

In the working configuration shown in FIG. 3, the light that is emitted from the first primary light source, is incident on the first light incident end surface and is introduced into the light conductor 3, is emitted at an inclination toward the upper left in FIG. 3 from the light emitting surface 33, and is introduced into the light deflecting element 4 from the first prism surface 411 of the light incident surface 41. This light is totally reflected (inside surface) by the second prism surface 412, and is emitted in a direction inclined to the left with respect to the normal direction of the prism row formation plane (in the direction forming the second angle). The light on this path is indicated by the symbol L2. Meanwhile, the light that is emitted from the second primary light source, is incident on the second light incident end surface, and is introduced into the light conductor 3, is emitted at an inclination toward the upper right in FIG. 3 from the light emitting surface 33, and is introduced into the light deflecting element 4 from the second prism surface 412 of the light incident surface 41. A portion of this light is totally reflected (inside surface) by the first region 4111 of the first prism surface 411, and is emitted in a direction inclined to the right with respect to the normal direction of the prism row formation plane (in the direction forming the first angle). The light on this path is indicated by the symbol L11. Furthermore, another portion [of the light] is totally reflected (inside surface) by the second region 4112 of the first prism surface 411, and is emitted in the normal direction of the prism row formation plane. The light on this path is indicated by the symbol L12.

FIG. 4 shows the luminosity distribution of the light emitted from the light emitting surface 42 in the XZ plane. Emitted light with a directionality having a peak in the normal direction of the prism row formation plane (angle 0°) is obtained mainly by means of the light L12, emitted light with a directionality having a peak in the direction at the first angle θ1 with respect to the normal direction of the prism row formation plane is obtained mainly by means of the light L11, and emitted light with a directionality having a peak in the direction of the second angle θ2 with respect to the normal direction of the prism row formation plane is obtained mainly by means of the light L2. Thus, emitted light with a directionality in a total of three directions is obtained. It is desirable that the angles θ1 and θ2 be set, for example, [in the range of] 20 to 40°, and a range of 25 to 35° is especially desirable.

As is shown in FIG. 3, the prism row pitch, i.e., the prism row width (dimension in the X direction) is P, the width of the first prism surface is W1, the width of the second prism surface is W2, and the widths of the first region 4111 and second region 4112 of the first prism surface are respectively W11 and W12. For example, the pitch P is 10 to 100 μm, and the widths W1, W2, W11 and W12 are appropriately set in accordance with the intensity ratio of the directional emitted light in the desired direction. For instance, the peak intensity ratio of the light L11 and light L12 can be varied by varying the ratio of the widths W11 and W12. The width W12 of the second region which mainly contributes to directional emission in the normal direction of the prism row formation plane is preferably 10 to 40% of the pitch P, more preferably in the range of 12 to 35%, and even more preferably in the range of 15 to 30%.

In the present invention, the judgment criterion for directionality in two different directions (separation of directionality) is as follows: namely, with regard to the smaller (M) of the emitted light intensities in these directions and the minimum value (N) of the emitted light intensities in directions between these directions, cases in which {(M−N)/(M+N)}≧0.15 are taken as cases in which there is separate directionality in these two directions. (M−N)/(M+N) is preferably 0.2 or greater, and is even more preferably 0.3 or greater.

By providing a first region 4111 and a second region 4112 with inclination angles differing by 5 to 20° from each other on the first prism surface 411, the light deflecting element 4 of the present working configuration can be caused to emit light with directionality in three different directions by means of these two regions and the second prism surface 412. Accordingly, light can be emitted with a favorable brightness in three required directions while reducing the power consumed by the primary light sources.

FIG. 5 is an explanatory diagram of still another working configuration of the prism row shape of the light deflecting element 4. Furthermore, FIG. 6 is a diagram showing the luminosity distribution of the light emitted from the light emitting surface 42 in the XZ plane. In these figures, members having the same functions as those in FIGS. 1 through 4 are labeled with the same symbols.

In the present working configuration, in addition to the first prism surface 411, the second prism surface 412 is also constructed from the two planes of a third region 4121 and a fourth region 4122 that extend in the Y direction, that respectively consist of single planes, and that have mutually different inclination angles. The third region 4121 is a region that is close to the top part of the prism row, and the fourth region 4122 is connected to the third region 4121, and is a region that is positioned further from the top part of the prism row than the third region 4121. The widths of the third region 4121 and fourth region 4122 are respectively W21 and W22. The third region 4121 forms an inclination angle of β, and the fourth region 4122 forms an inclination angle of β', with respect to the normal direction of the prism row formation plane. The difference in inclination angle (β-β') between the third region 4121 and fourth region 4122 is preferably 5 to 20°, more preferably 7 to 17°, and even more preferably 10 to 15°.

Along with the second region 4112, the fourth region 4122 contributes mainly to directional light emission in the normal direction of the prism row formation plane. Accordingly, the angle α and the angle β are substantially the same, and the angle α' and the angle β' are substantially the same. In the present working configuration, it is desirable that the total of the widths of the second region and fourth region (W12+W22) that contribute mainly to directional light emission in the normal direction of the prism row formation plane be 10 to 40% of the pitch P; [this value is] more preferably in the range of 12 to 35%, and even more preferably in the range of 15 to 30%.

In the present working configuration, the light that is emitted from the first primary light source, incident on the first light incident end surface, and introduced into the light conductor 3 is emitted at an inclination upward toward the upper left in FIG. 5 from the light emitting surface 33, and is introduced into the light deflecting element 4 from the first prism surface 411 of the light incident surface 41. A portion of this light is totally reflected (inside surface) by the third region 4121 of the second prism surface 412, and is emitted in a direction inclined to the left with respect to the normal direction of the prism row formation plane (in the direction forming the second angle). The light on this path is indicated by the symbol L21. Furthermore, another portion [of this light] is totally reflected (inside surface) by the fourth region 4122 of the second prism surface 412, and is emitted in the normal direction of the prism row formation plane. The light on this path is indicated by the symbol L22.

In the present working configuration, the intensity of the light emitted in the normal direction of the prism row formation plane is high compared to the case of FIG. 4, and the intensity of the light emitted in the direction forming the second angle $\theta 2$ with this [normal direction] is low.

FIG. 7 is an explanatory diagram of still another working configuration of the prism row shape of the light deflecting element 4. Furthermore, FIG. 8 is a diagram showing the luminosity distribution of the light emitted from the light emitting surface 42 in the XZ plane. In these figures, members that have the same functions as in FIGS. 1 through 6 are labeled with the same symbols.

The present working configuration differs from the working configuration shown in FIGS. 5 and 6 in that the second region 4112 and fourth region 4122 are constructed from convex surfaces. These convex surfaces may be constructed so that the shape of the XZ cross-sectional surface has a circular arc shape (the shape of a portion of a cylindrical surface), or so that the XZ cross-sectional shape has a non-circular arc shape (e.g., the shape of a portion of an ellipse or a parabola). By appropriately setting the shapes of the convex surfaces of the second region 4112 and fourth region 4122, it is possible to set the degree of directionality in the normal direction of the prism row formation plane, i.e., the emitted light luminosity distribution, at a desired value. For example, by appropriately setting the curvature radius, it is possible to increase the degree of directionality in the normal direction of the prism row formation plane, so that the peak value of the emitted light is increased as shown in FIG. 8. Conversely, by lowering the degree of directionality in this direction, it is possible to broaden the distribution range of the emitted light, so that the visual field range can also be broadened.

In the present working configuration, the second region 4112 and fourth region 4122 were constructed from convex surfaces; however, it would also be possible to construct the second region 4112 and fourth region 4122 from concave surfaces. In this case, the degree of directionality in the normal direction of the prism row formation plane drops, so that the distribution range of the emitted light is broadened, thus making it possible to broaden the visual field range. The degree of this can be adjusted to the desired value by setting the curvature radius.

In the present invention, at least one region selected from the first region 4111, second region 4112, third region 4121 and fourth region 4122 is constructed from a convex or concave surface, and the remaining regions are constructed as flat surfaces, so that the degree of directionality of emitted light that is emitted in a specified direction can be controlled.

Furthermore, in the present invention, the inclination angle of the curved surface such as a convex surface refers to the average of the inclination angles in all positions on such a single surface as a convex surface. In approximate terms, however, as is shown in FIG. 7, this can be represented using the inclination of a line segment connecting both ends of the curved part in the XZ cross-sectional plane.

In the above working configurations, a case in which emitted light with directionality in three directions, i.e., the normal direction of the prism row formation plane, and one direction each on the left and right of this normal direction, was described as an example. In the present invention, however, [the number of] directions of this directionality is not limited to three; [the number of directions] may be two directions, or four or more directions.

In cases where emitted light having directionality in two directions is emitted, in the example shown in FIG. 3, for instance, it is sufficient if the inclination angle $\beta$ of the second prism surface 412 is set so that the direction of emission of the light that is totally reflected (inside surface) by the second prism surface 412 is the normal direction of the prism row formation plane. Furthermore, in cases where emitted light having directionality in four or more directions is emitted, in the example shown in FIG. 3, for instance, other regions with different inclination angles from those of the first region 4111 and second region 4112 may be formed on the first prism surface 411; in the example shown in FIG. 5, other regions with different inclination angles from those of the third region 4121 and fourth region 4122 may be formed on the second prism surface 412, or in the example shown in FIG. 5, the inclination angle of the fourth region 4122 may be altered so as to cause inside-surface reflection in a different direction from the directions of the inside-surface reflected light of the first through third regions.

Furthermore, in the working configurations described above, [the system] was devised so that the second region 4112 was positioned on the side further from the top part of the prism row than the first region 4111. Conversely, however, it would also be possible to devise [the system] so that the first region 4111 with an inclination angle of $\alpha$ is positioned on the side further from the top part of the prism row than the second region 4112 with an inclination angle of $\alpha'$. Similarly, it would also be possible to devise [the system] so that the third region 4121 with an inclination angle of $\beta$ is positioned on the side further from the top part of the prism row than the fourth region 4122 with an inclination angle of $\beta'$. However, from the standpoint of the productivity, durability, and the like of the light deflecting element 4, it is desirable to use a construction in which the second region 4112 with a small inclination angle is positioned on the side further from the top part of the prism row than the first region 4111 as in the working configuration described above.

Furthermore, in the working configuration described above, a case was described in which a first region and a second region were formed on the first prism surface, and a third region and a fourth region were formed on the second prism surface (i.e., a case was described in which four regions were formed). However, in the present invention, other regions may be formed on either prism surface or on both prism surfaces. In this case, the other regions are formed between the first region and second region, or between the third region and fourth region, and the inclination angles of these regions are set smaller than the inclination angle of the first region or third region, but larger than the inclination angle of the second region or fourth region.

The primary light source 1 is a linear light source that extends in the Y direction; for example, a fluorescent lamp or a cold cathode tube can be used. Furthermore, in the present invention, the primary light source 1 is not limited to a linear light source; a point light source such as an LED light source, halogen lamp, or metahalogen lamp may also be used. Moreover, the light source reflector 2 conducts the light of the primary light source 1 to the light conductor 3 with little loss. For example, a plastic film which has a vacuum evaporated metal reflective layer on the surface can be used as the material [of this reflector]. As is shown in FIG. 1, the light source reflector 2 is wrapped from the outside surface of the end edge part of the light reflecting element 5 onto the end edge part of the light emitting surface of the light deflecting element 4 via the outside surface of the primary light source 1. On the other hand, the light source reflector 2 can also be wrapped from the outside surface of the end edge part of the light reflecting element 5 onto the end edge part of the light emitting surface of the light conductor 3 via the outside surface of the primary light source 1, avoiding the light deflecting element 4.

A reflective member similar to such a light source reflector 2 can also be attached to side end surfaces of the light conductor 3 other than the light incident end surfaces 31. For example, a plastic sheet which has a vacuum evaporated metal reflective layer on the surface can be used as the light reflecting element 5. In the present invention, a light reflecting layer or the like formed by the vacuum evaporation of a metal or the like on the back surface 34 of the light conductor 3 can also be used as the light reflecting element 5 instead of a reflective sheet.

In the present invention, as another working configuration, it is also possible to use one end surface of the light conductor as a light incident end surface, and to construct a light source device in which a primary light source is disposed adjacent to this light incident end surface. In this case, in the light deflecting element that is disposed on the light emitting surface of the light conductor, a plurality of prism rows that extend in a direction substantially parallel to the light incident end surface and that are parallel to each other are formed on the light incident surface disposed facing the light emitting surface of the light conductor, each of the prism rows is formed from a first prism surface on the side close to the primary light source and a second prism surface on the side distant from the primary light source, and has on the first prism surface a first region that extends in the direction of extension of the prism row and a second region that extends in the direction of extension of the above-mentioned prism row, the prism row vertical angle is 50 to 90°, the difference in inclination angle between the first region and the above-mentioned second region is 10 to 25°, and the inclination angle of the second region is set at a smaller angle than the inclination angle of the first region. Specifically, in the working configuration shown in FIG. 3, the prism vertical angle ($\alpha+\beta$) is set in the range of 50 to 90°, and the difference in inclination angle ($\alpha-\alpha'$) between the first region 4111 and second region 4112 constituting the first prism surface 411 is set in the range of 10 to 25°.

In cases where this prism vertical angle ($\alpha+\beta$) is less than 50°, it tends to become difficult to obtain emitted light directionality in directions differing by a required angle from the normal direction of the prism row formation plane, while in cases where the prism vertical angle exceeds 90°, it tends to become difficult to obtain a sufficient brightness. With regard to the angles $\alpha$ and $\beta$ of the prism vertical angle that are distributed on the left and right with respect to the normal direction of the prism row formation plane, it is preferable that $\alpha$ be in the range of 5 to 50°, and that $\beta$ be in the range of 40 to 60°, and it is even more preferable that $\alpha$ be in the range of 10 to 40°, and that $\beta$ be in the range of 40 to 55°. Furthermore, the difference in inclination angle ($\alpha-\alpha'$) between the first region 4111 and second region 4112 is preferably 10 to 25°, more preferably 15 to 25°, and even more preferably 17 to 23°. In cases where this difference in inclination angle ($\alpha-\alpha'$) is less than 10° or greater than 25°, it tends to become difficult to obtain emitted light directionality in a direction that differs from the normal direction of the prism row formation plane by a required angle.

In the present working configuration, the light that is emitted from the primary light source, incident on the light incident end surface and introduced into the light conductor 3 is emitted at an inclination to the upper right in FIG. 3 from the light emitting surface 33, and is introduced into the light deflecting element 4 from the second prism surface 412 of the light incident surface 41. A portion of this light is totally reflected (inside surface) by the first region 4111 of the first prism surface 411, and is emitted in a direction inclined to the right with respect to the normal direction of the prism row formation plane (in the direction forming the first angle). The light on this path is light indicated by the symbol L11. Furthermore, another portion [of this light] is totally reflected (inside surface) by the second region 4112 of the first prism surface 411, and is emitted in a direction inclined to the left with respect to the normal direction of the prism row formation plane (in the direction forming the second angle and the direction of the path indicated by L2). As a result, emitted light having mainly a directionality with a peak in the direction of the first angle $\theta$1 with respect to the normal direction of the prism row formation plane, and emitted light having mainly a directionality with a peak in the direction of the second angle $\theta$2 with respect to the normal direction of the prism row formation plane, are obtained, so that emitted light having a directionality in two directions is obtained. The angles $\theta$1 and $\theta$2 are preferably set, for example, at 20 to 40°, and are even more preferably set in the range of 25 to 35°.

In the light deflecting element 4 of the present working configuration, by providing a first region 4111 and a second region 4112 with inclination angles that differ from each other by 10 to 25° on the first prism surface 411, it is possible to cause the emission of light with a directionality in two different directions by means of these two regions. Accordingly, light can be emitted with a favorable brightness in two required directions while reducing the power consumed by the primary light source.

In the present working configuration, by forming a fifth region 4113 having a smaller inclination angle than the first region 4111 and a larger inclination angle than the second region 4112 between the first region 4111 and second region 4112, it is possible to obtain emitted light with a directionality having peaks in the direction having the above-mentioned first angle $\theta$1, the direction having the second angle $\theta$2, and the normal direction of the prism row formation plane or a third direction in the vicinity of this normal direction, so that light can be emitted with a directionality in three mutually different directions by means of these three regions. In this case, the width of the fifth region 4113 that contributes mainly to the directional emission in the normal direction of the prism row formation plane is preferably 10 to 40% of the pitch P, more preferably in the range of 12 to 35%, and even more preferably in the range of 15 to 30%.

The light conductor 3 and light deflecting element 4 of the present invention can be constructed from a synthetic resin with a high light transmissivity. Methacrylic resins, acrylic resins, polycarbonate resins, polyester resins, and vinyl chloride resins can be cited as examples of such synthetic resins. In particular, methacrylic resins are superior in terms of a high light transmissivity, heat resistance, mechanical characteristics and moldability, and are therefore optimal [for use]. Such methacrylic resins are resins consisting chiefly of methyl methacrylate units, and are preferably resins consisting of 80 wt % or more methyl methacrylate units. In the formation of a surface structure such as a rough surface of the light conductor 3 or light deflecting element 4, or a surface structure such as a prism row, this formation may be accomplished by hot-pressing a transparent synthetic resin plate using a mold member having the desired surface structure, or a shape may be imparted simultaneously with molding by screen printing, extrusion molding, injection molding, or the like. Furthermore, a structural surface can also be formed using a heat- or light-curable resin or the like. Moreover, it would also be possible to form a rough surface structure or lens row array structure consisting of an active energy radiation curable resin on the surface of a transparent substrate such as a transparent film or sheet consisting of a polyester resin, acrylic resin, polycarbonate resin, vinyl chloride resin, polymethacrylimide resin, or the like, and to join and integrate such a sheet with a separate transparent substrate by a method such as adhesive bonding or fusion bonding. Polyfunctional (meth)acrylic compounds, vinyl compounds, (meth)acrylic acid esters, allyl compounds, (meth)acrylic acid metal salts, and the like can be used as active energy radiation curable resins.

The light diffusing element 6 is used as necessary for purposes such as suppressing glare that causes a drop in the quality of the image display and suppressing irregularities in brightness. With regard to the light diffusing element 6, it is desirable to use a light diffusing element 6 having light diffusion characteristics that cause the appropriate diffusion of light emitted from the light deflecting element 4 while taking into account the balance of directional characteristics, brightness characteristics, visibility, quality, and the like. However, since the degree of directionality tends to drop as a result of the use of a light diffusing element 6, it is desirable to use an element that shows a relatively weak diffusion of light.

With regard to the light diffusing element 6, this light diffusing element 6 can be disposed as a separate body on the side of the light emitting surface of the light deflecting element 4, or can be integrated with the light deflecting element 4 on the side of the light emitting surface of the light deflecting element 4. However, it is desirable that the light diffusing element 6 be disposed as a separate body. In cases where the light diffusing element 6 is disposed as a separate body, it is desirable to provide a concavo-convex structure on the surface of the light diffusing element 6 located adjacent to the light deflecting element 4 in order to prevent sticking with the light deflecting element 4. Similarly, in the emitting surface of the light diffusing element 6 as well, it is necessary to consider sticking with the liquid crystal display element disposed on top of this, and it is desirable to provide the emitting surface of the light diffusing element 6 with a concavo-convex structure as well. In cases where this concavo-convex structure is provided only for the purpose of preventing sticking, it is desirable to form a structure which is such that the average inclination angle is 0.7° or greater. More desirable is [an angle of] 1° or greater, and even more desirable is [an angle of] 1.5° or greater.

Light diffusion characteristics can be imparted by mixing a light diffusing agent in the light diffusing element 6, or providing at least one surface of the light diffusing element 6 with a concavo-convex structure. In a concavo-convex structure formed on the surface, the degree [of the characteristics] differs in cases where this structure is formed on one of the surfaces of the light diffusing element 6 and cases where this structure is formed on both surfaces [of the light diffusing element 6]. In cases where a concavo-convex structure is formed on one of the surfaces of the light diffusing element 6, it is desirable that the average inclination angle be set in the range of 0.8 to 12°; [an angle of] 3.5 to 7° is more desirable, and [an angle of] 4 to 6.5° is even more desirable. In cases where a concavo-convex structure is formed on both surfaces of the light diffusing element 6, it is desirable that the average inclination angle of the concavo-convex structure formed on one surface be set in the range of 0.8 to 6°; [an angle of] 2 to 4° is more desirable, and [an angle of] 2.5 to 4° is even more desirable. In this case, in order to suppress a drop in the total light ray transmissivity of the light diffusing element 6, it is desirable to set the average inclination angle on the incident surface side of the light diffusing element 6 at a value that is larger than that of the average inclination angle on the emission surface side. Furthermore, it is desirable from the standpoint of improving visibility to set the haze value of the light diffusing element 6 in the range of 8 to 82%; more desirable is a range of 30 to 70%, and even more desirable is a range of 40 to 65%.

A liquid crystal display device is constructed by disposing a liquid crystal display element on the light emitting surface (i.e., the surface of the light diffusing element 6) of such a light source device consisting of a primary light source 1, a light source reflector 2, a light conductor 3, a light deflecting element 4, a light reflecting element 5 and a light diffusing element 6. The liquid crystal display device is observed by the observer via the liquid crystal display element in three directions from above in FIG. 1 (specifically, in the normal direction of the prism row formation plane and in the directions respectively forming the angle $\theta 1$ and angle $\theta 2$ with respect to the normal direction of the prism row formation plane in the XZ plane). Since light irradiation concentrated in the desired direction is obtained, the utilization efficiency of the quantity of light emitted by the primary light source with respect to illumination in these three directions can be heightened.

In the present invention, it is also possible to include a light diffusing material in the light deflecting element 4 or light diffusing element 6 for the purpose of adjusting the visual field angle of the light source device or improving the quality. Fine transparent particles having a different refractive index from that of the material that constitutes the light deflecting element 4 or light diffusing element 6 can be used as such a light diffusing material. Examples of such materials include homopolymers or copolymers such as silicone beads, polystyrenes, polylmethyl methacrylates, and fluorinated methacrylates. In the case of such light diffusing materials, the content, particle size, refractive index, and the like must be appropriately selected so that there is no loss of the directional characteristics of the light deflecting element 4 or appropriate diffusing effect of the light diffusing element 6. For example, if the difference between the refractive index of the light diffusing material and the refractive index of the material constituting the light deflecting element 4 or light diffusing element 6 is too small, the diffusing effect is small; [on the other hand,] if [this difference is] too large, an excessive scattering refractive effect is generated; accordingly, this refractive index difference is preferably in the range of 0.01 to 0.1, more preferably [in the range of] 0.03 to 0.08, and even more preferably in the range of 0.03 to 0.05. Furthermore, if the particle size of the diffusing material is too large, scattering becomes strong, leading to a drop in glare and brightness, while if [this particle size is] too small, coloring occurs. Accordingly, the mean particle size is preferably in the range of 0.5 to 20 μm, more preferably in the range of 2 to 15 μm, and even more preferably in the range of 2 to 10 μm.

EMBODIMENTS

Below, the present invention will be concretely described in terms of embodiments. Furthermore, the measurement of the respective characteristic values in the embodiments below was accomplished as follows:

Measurement of Luminosity Distribution

Using a cold cathode tube as the primary light source, [this light source] was lit at a high frequency by applying DC 12 V to the inverter of the driving circuit (HIU-742A manufactured by Harrison Co.). A black paper having a 4 mm φ pinhole was fastened to the surface of the light conductor or light deflecting element of the light source device so that the pinhole was positioned in the center of the surface of the light conductor or light deflecting element of the light source device, and the distance was adjusted so that the measurement circle of the brightness gauge was 8 to 9 mm. [The system] was adjusted so that the rotating shaft of the goniometer is rotated about the pinhole (i.e., about a direction parallel to the axis in the direction of length of the cold cathode tube), and the luminosity distribution (in the XZ plane) of the emitted light was measured by the brightness gauge while the rotating shaft was rotated from +90° to −90° at 0.5° intervals. Furthermore, with regard to the peak angle, cases of inclination to one side with respect to the normal direction were taken as negative values, and cases of inclination to the other side were taken as positive values.

Measurement of Average Inclination Angle (θa)

In accordance with ISO4287/1-1987, the surface roughness of the rough surface was measured at a driving rate of 0.03 mm/second by means of a contact stylus type surface roughness gauge (Surfcom 570A manufactured by Tokyo Seiki) using a 010-2528 (1 μm R, 55° circular cone, diamond) as a contact stylus. The inclination was corrected by subtracting the average line from the chart obtained by this measurement, and [the angle] was determined by calculations using the above-mentioned equations (1) and (2).

Embodiment 1

A 14-inch light conductor with [dimensions of] 210 mm×300 mm and a thickness of 6 mm was manufactured using a mat with one surface having an average inclination angle of 8°, and with prism rows having a prism vertical angle of 100° and a pitch of 50 μm extending in the direction perpendicular to the side with a length of 300 mm (the long side) disposed side by side on the other surface, by injection-molding an acrylic resin (Acrypet VH5#000 manufactured by Mitsubishi Rayon Co.). Cold cathode tubes were disposed along both side end surfaces corresponding to the side of the light conductor with a length of 300 mm (long side) so that these tubes were covered by the light source reflector (reflective silver film manufactured by Reiko Co.). Furthermore, a light diffusing reflective film (E60 manufactured by Toray) was pasted to the other side end surfaces, and a reflective sheet was disposed on the surface (back surface) on which the prism rows were arranged. The above construction was assembled in a frame body. In the emitted light luminosity distribution in the plane perpendicular to both the light incident end surfaces and light emitting surface (i.e., in the XZ plane), this light conductor had a luminosity distribution in which there was a peak angle in the two directions at 27° on mutually opposite sides with respect to the light emitting surface, and in which the full widths at half maximum were respectively 44°.

Meanwhile, using an acrylic type ultraviolet curable resin with a refractive index of 1.5064, a prism sheet was manufactured in which a prism row formation plane having prism rows with a cross-sectional shape (angle) and dimensions (units μm) such as those shown in FIG. 9 provided continuously in a substantially side-by-side configuration was formed on one surface of a polyester film with a thickness of 125 μm.

The prism sheet thus obtained was placed on the light emitting surface (mat surface) of the above-mentioned light conductor so that the prism row formation plane was on the light conductor side, and so that the ridge lines were parallel to the light incident end surfaces of the light conductor, thus producing a light source device. When the emitted light luminosity distribution in the plane perpendicular to both the light incident end surfaces and light emitting surface of this light source device (i.e., in the XZ plane) was determined, [this distribution] had directionality in three directions as shown in FIG. 10.

Embodiment 2

A light source device was obtained in the same manner as in Embodiment 1, except for the fact that prism rows with a cross-sectional shape (angle) and dimensions (units μm) shown in FIG. 11 were used as the prism rows of the prism sheet. When the emitted light luminosity distribution in the plane perpendicular to both the light incident end surfaces and light emitting surface of this light source device (i.e., in the XZ plane) was determined, [this distribution] had directionality in three directions as shown in FIG. 12.

Embodiment 3

A light source device was obtained in the same manner as in Embodiment 1, except for the fact that prism rows with a cross-sectional shape (angle) and dimensions (units μm) shown in FIG. 13 were used as the prism rows of the prism sheet. When the emitted light luminosity distribution in the plane perpendicular to both the light incident end surfaces and light emitting surface of this light source device (i.e., in the XZ plane) was determined, [this distribution] had directionality in three directions as shown in FIG. 14.

Embodiment 4

A light source device was obtained in the same manner as in Embodiment 1, except for the fact that prism rows with a cross-sectional shape (angle) and dimensions (units μm) shown in FIG. 15 were used as the prism rows of the prism sheet. When the emitted light luminosity distribution in the plane perpendicular to both the light incident end surfaces and light emitting surface of this light source device (i.e., in the XZ plane) was determined, [this distribution] had directionality in three directions as shown in FIG. 16.

Embodiment 5

A light source device was obtained in the same manner as in Embodiment 1, except for the fact that prism rows with a cross-sectional shape (angle) and dimensions (units μm) shown in FIG. 17 were used as the prism rows of the prism sheet, and that a cold cathode tube was disposed along one side end surface corresponding to the side of the light conductor with a length of 300 mm (long side). When the emitted light luminosity distribution in the plane perpendicular to both the light incident end surfaces and light emitting surface of this light source device (i.e., in the XZ plane) was determined, [this distribution] had directionality in three directions as shown in FIG. 18.

INDUSTRIAL APPLICABILITY

The present invention relates to an edge lighting type light source device constituting a display device such as a liquid crystal display device, and a light deflecting element used in this light source device.

EXPLANATION OF SYMBOLS

Figure 1:
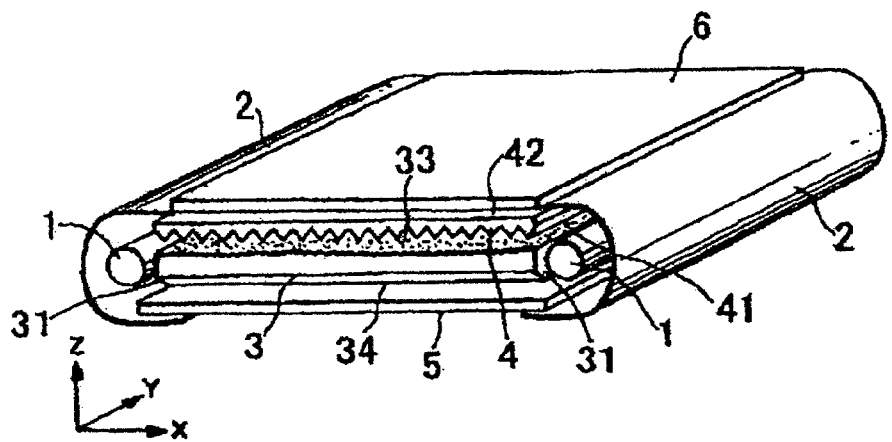
FIG. 1 is a model perspective view showing one working configuration of the light source device of the present invention.
Figure 2:
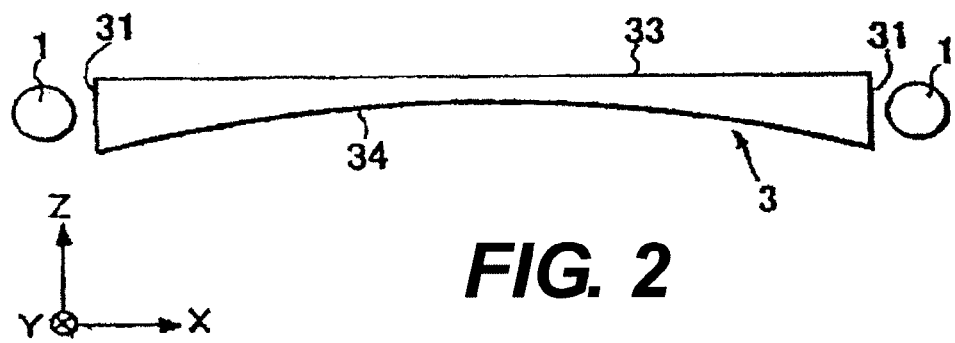
FIG. 2 is a model diagram showing a modified example of the light conductor.
Figure 3:
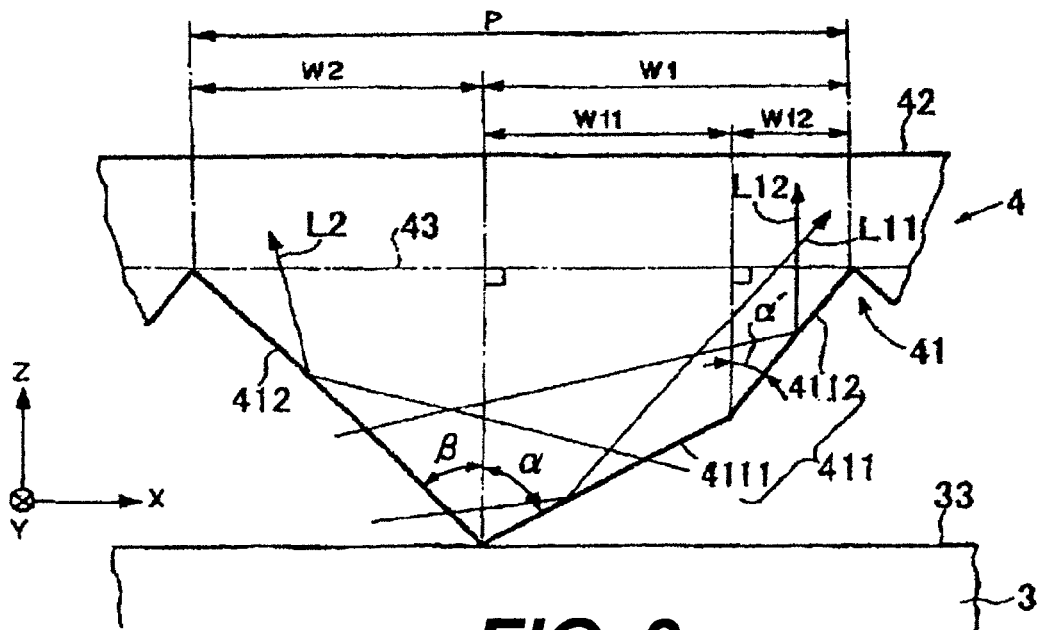
FIG. 3 is an explanatory diagram of the prism row shape of the light deflecting element.
Figure 4:
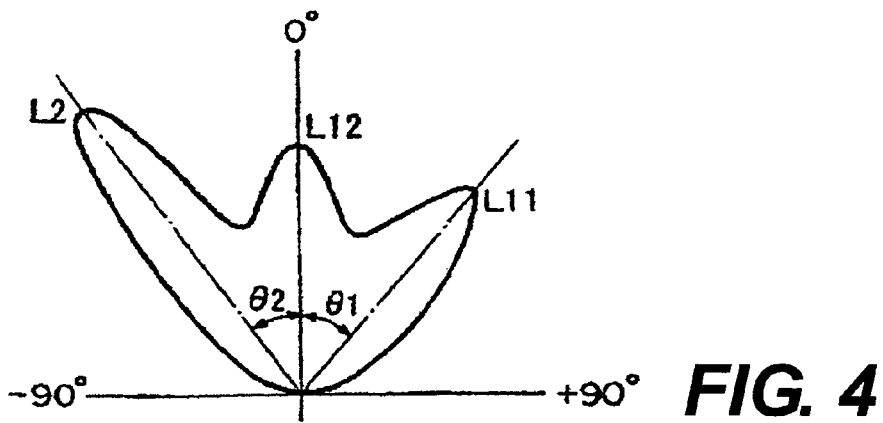
FIG. 4 is a diagram showing the luminosity distribution of the light emitted from the light emitting surface in the XZ plane.
Figure 5:
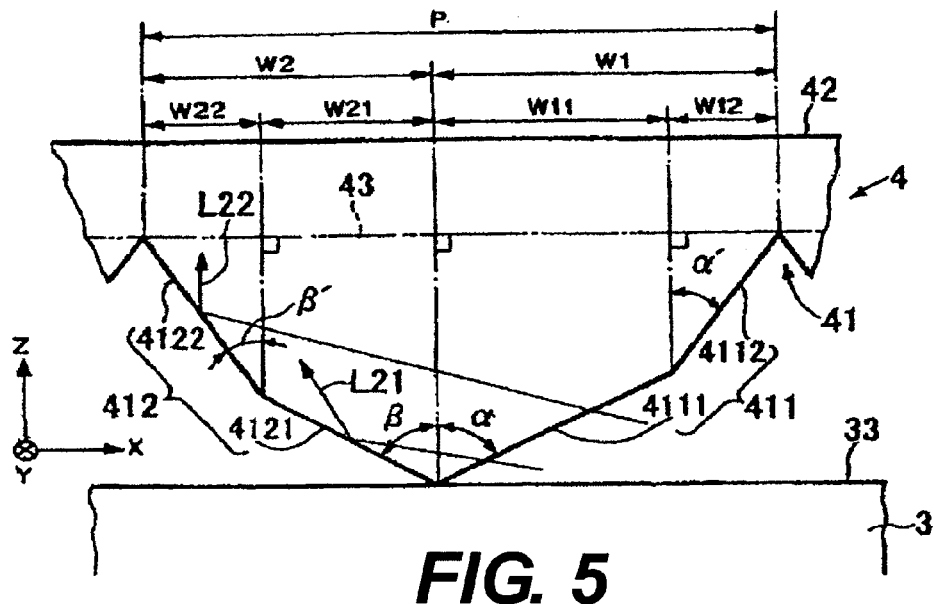
FIG. 5 is an explanatory diagram of the prism row shape of the light deflecting element.
Figure 6:
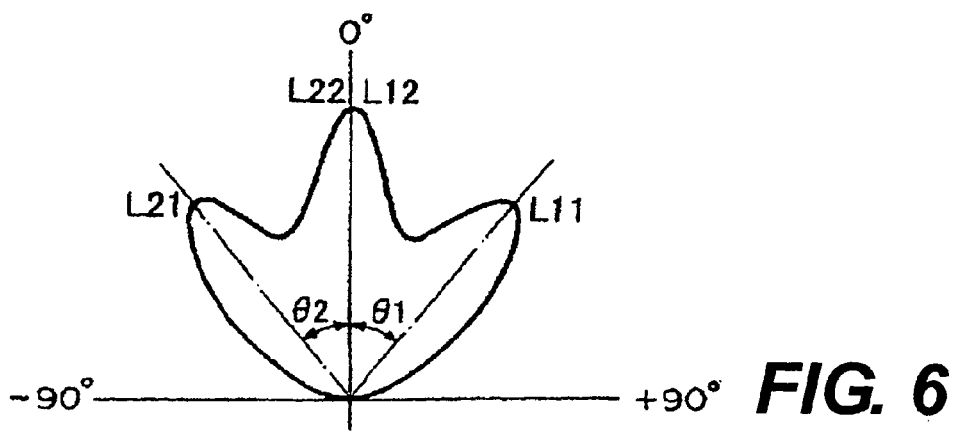
FIG. 6 is a diagram showing the luminosity distribution of the light emitted from the light emitting surface in the XZ plane.
Figure 7:
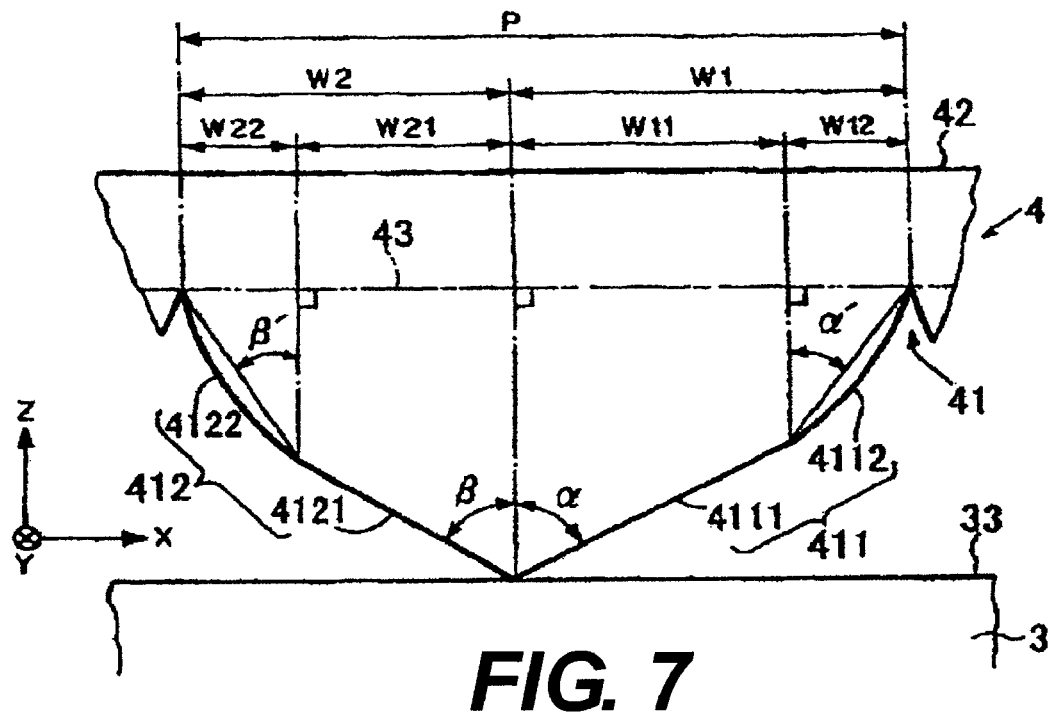
FIG. 7 is an explanatory diagram of the prism row shape of the light deflecting element.
Figure 8:
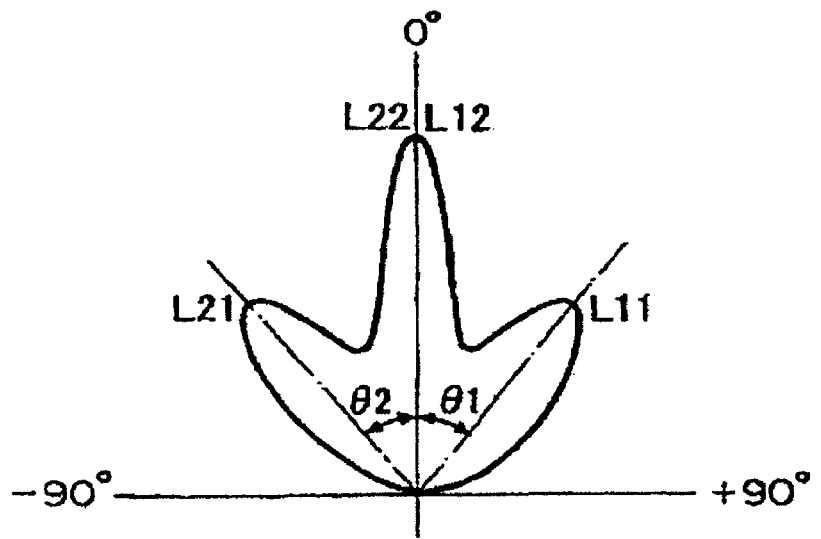
FIG. 8 is a diagram showing the luminosity distribution of the light emitted from the light emitting surface in the XZ plane.
Figure 9:
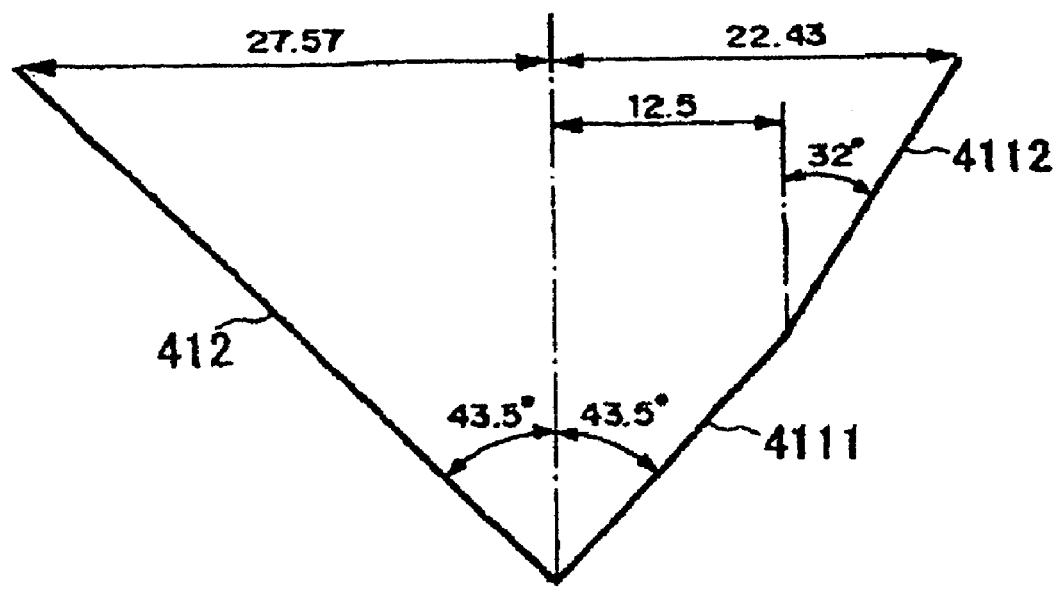
FIG. 9 is a diagram showing the cross-sectional shape and dimensions of the prism rows used in an embodiment.
Figure 10:
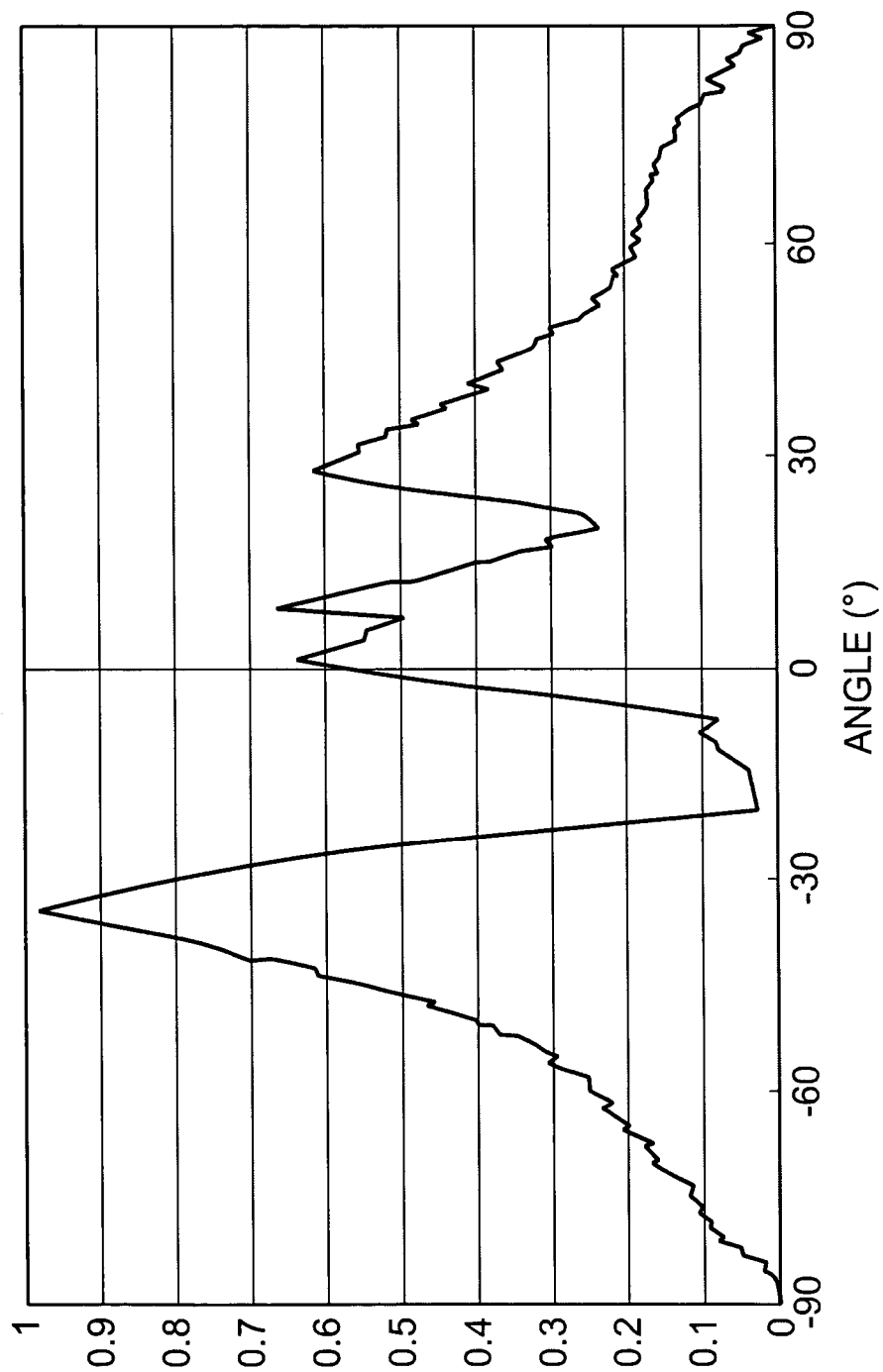
FIG. 10 is a luminosity distribution diagram of the emitted light of the light source device obtained in an embodiment.
Figure 11:
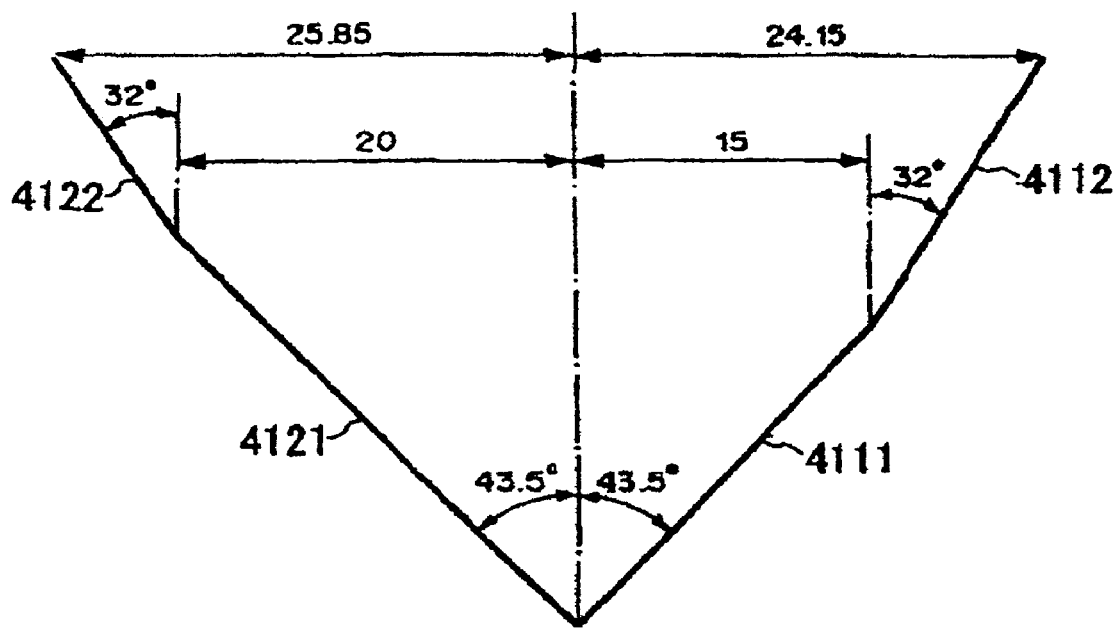
FIG. 11 is a diagram showing the cross-sectional shape and dimensions of the prism rows used in an embodiment.
Figure 12:
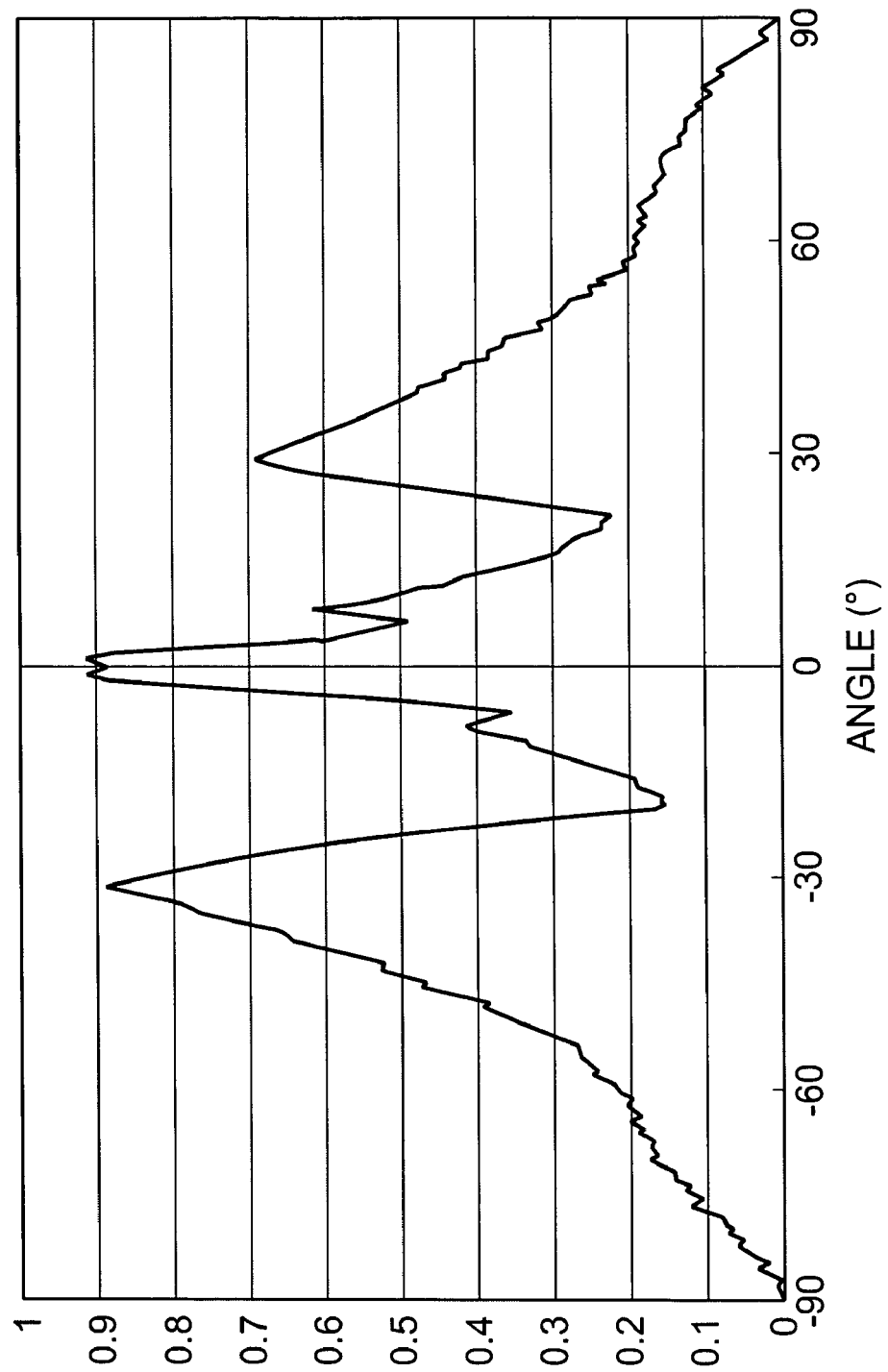
FIG. 12 is a luminosity distribution diagram of the emitted light of the light source device obtained in an embodiment.
Figure 13:
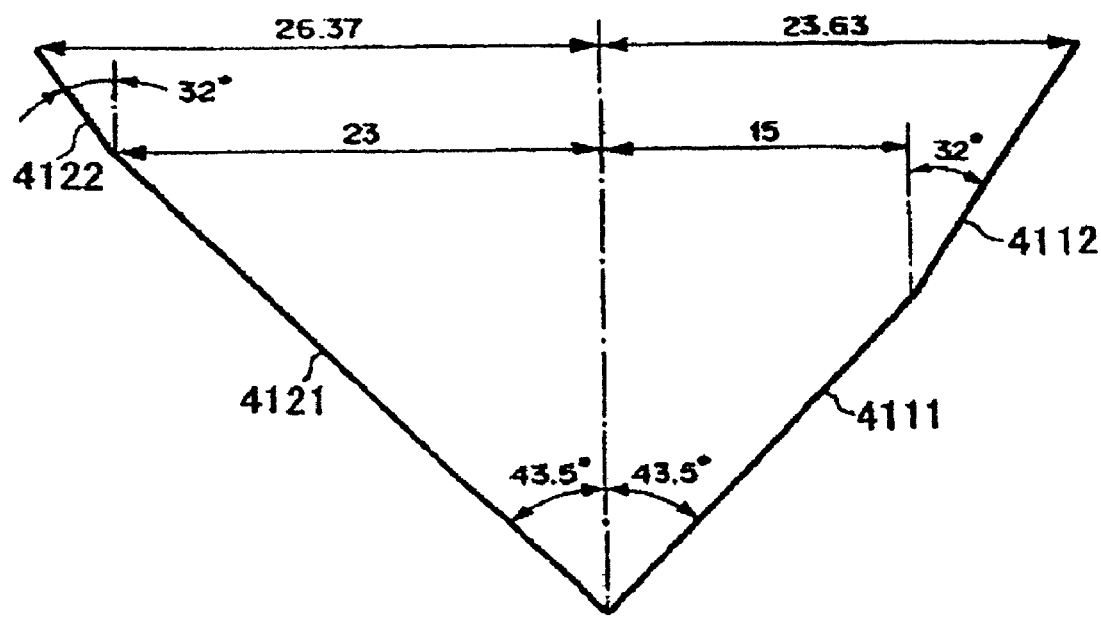
FIG. 13 is a diagram showing the cross-sectional shape and dimensions of the prism rows used in an embodiment.
Figure 14:
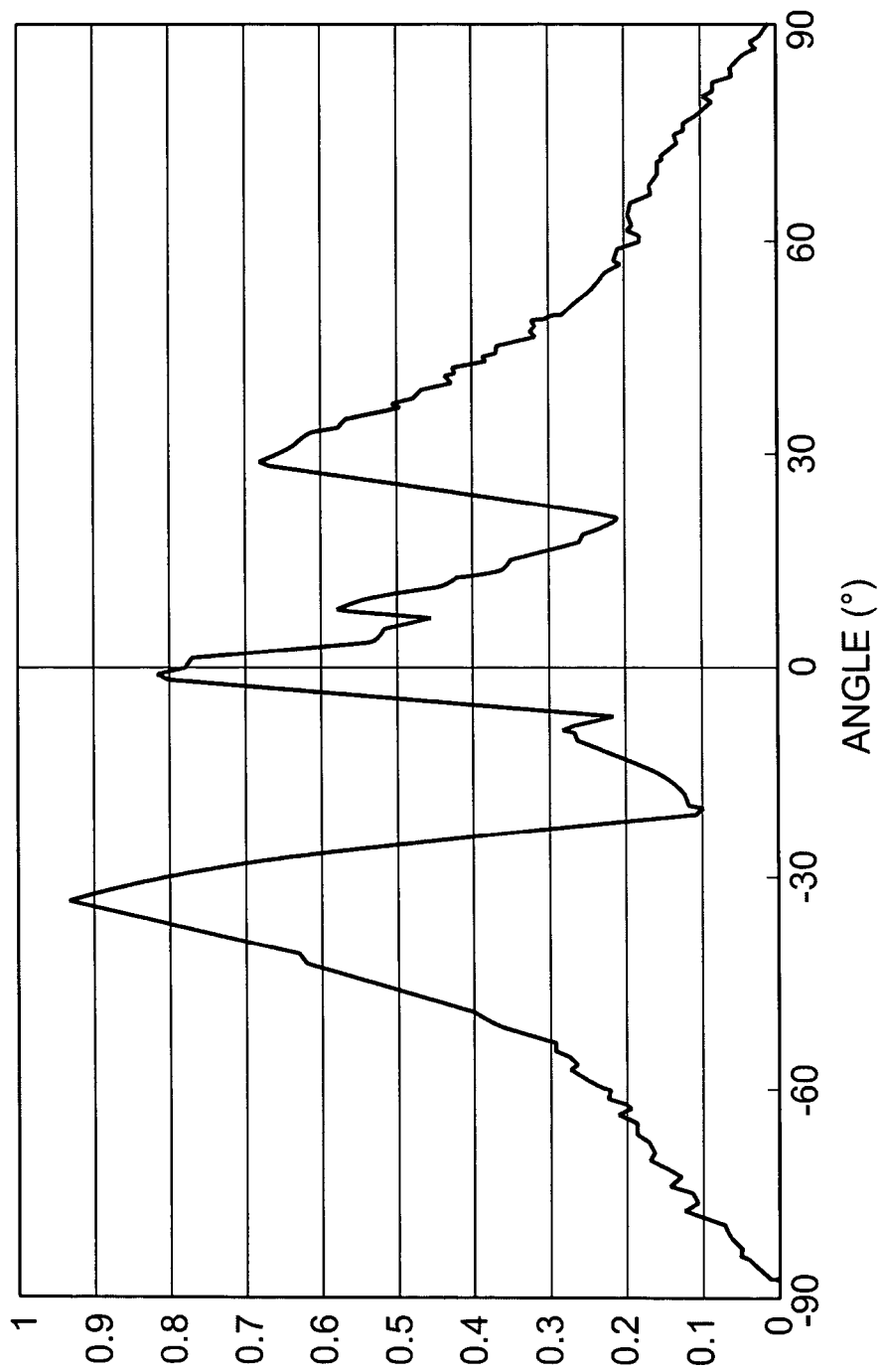
FIG. 14 is a luminosity distribution diagram of the emitted light of the light source device obtained in an embodiment.
Figure 15:
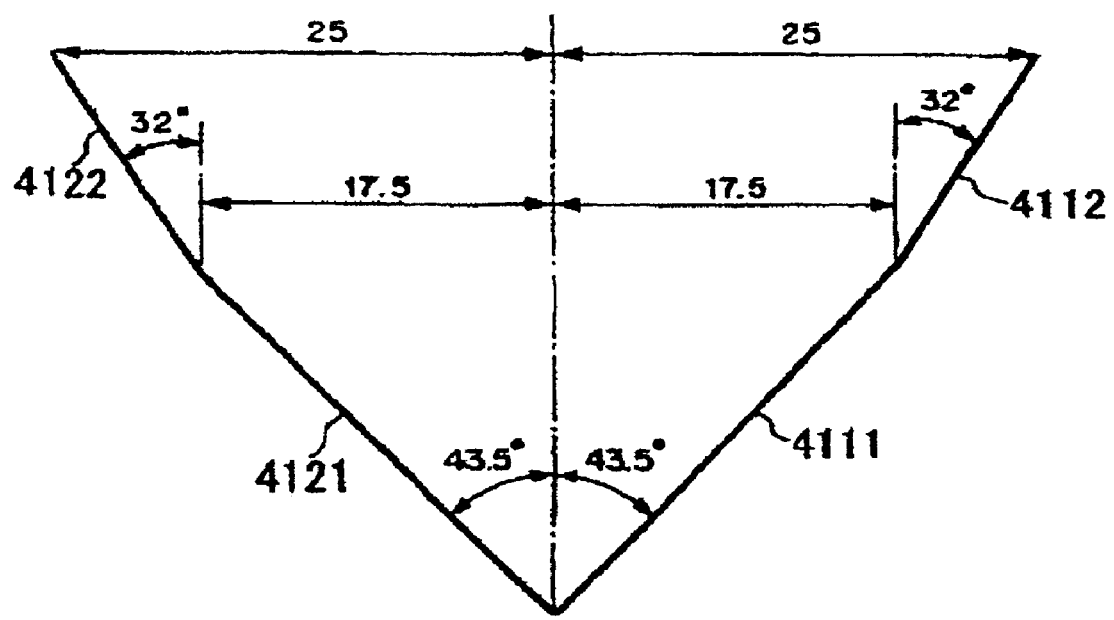
FIG. 15 is a diagram showing the cross-sectional shape and dimensions of the prism rows used in an embodiment.
Figure 16:
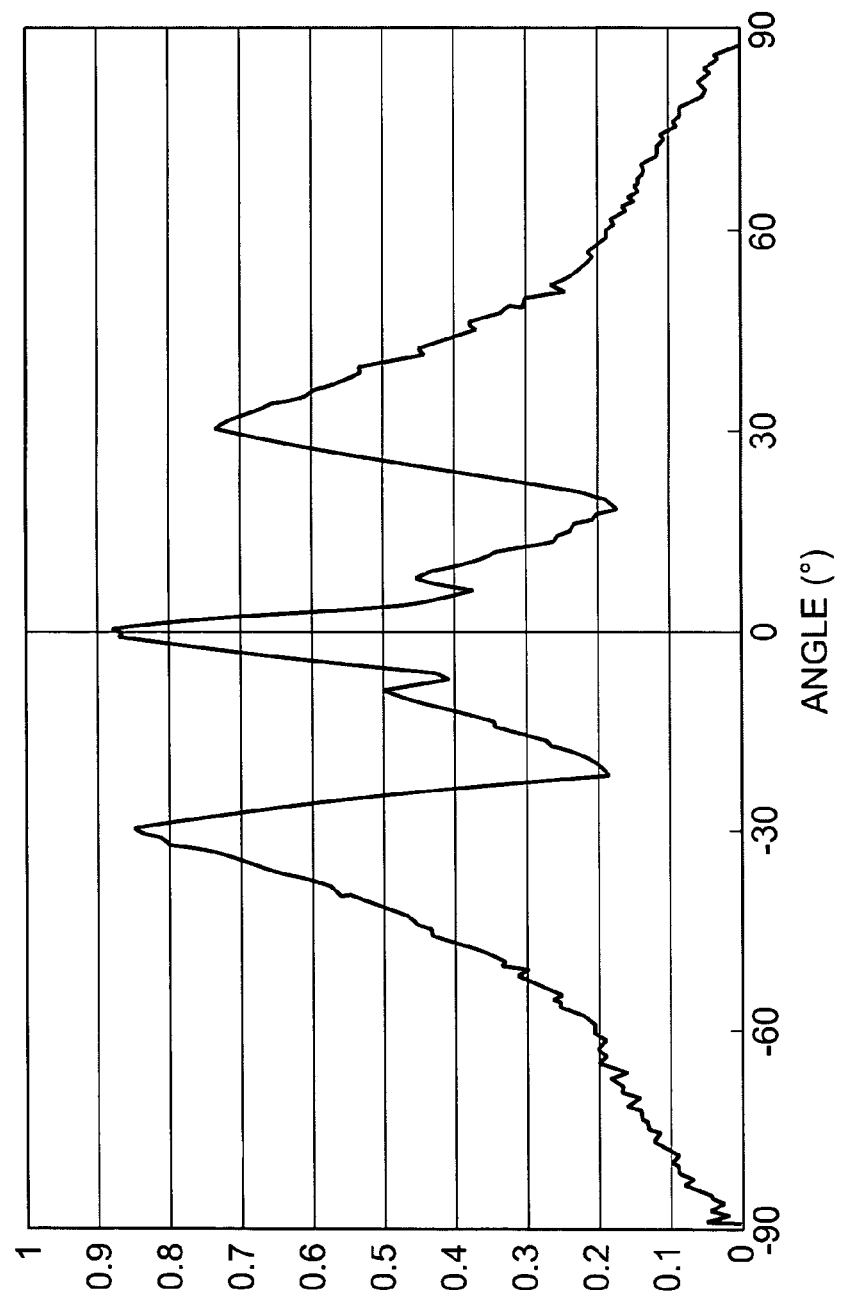
FIG. 16 is a luminosity distribution diagram of the emitted light of the light source device obtained in an embodiment.
Figure 17:
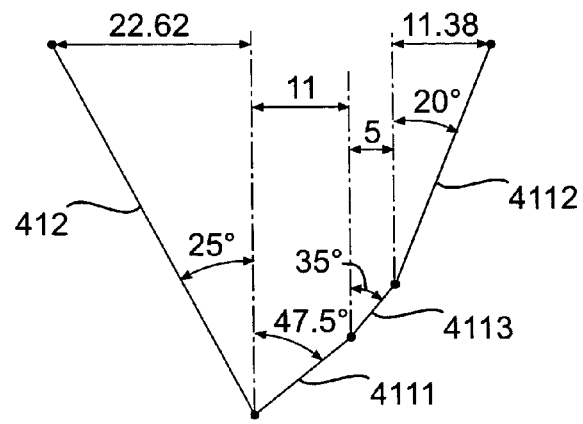
FIG. 17 is a diagram showing the cross-sectional shape and dimensions of the prism rows used in an embodiment.
Figure 18:
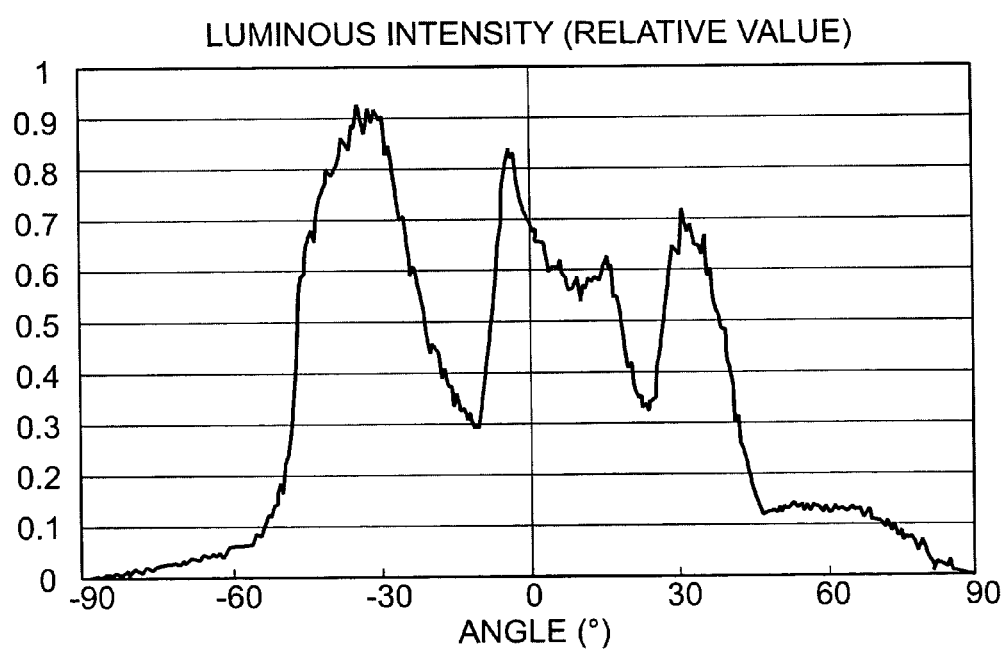
FIG. 18 is a luminosity distribution diagram of the emitted light of the light source device obtained in an embodiment.

1: Primary light source
2: Light source reflector
3: Light conductor
31: Light incident end surface
33: Light emitting surface
34: Back surface
4: Light deflecting element
41: Light incident surface
411: First prism surface
4111: First region
4112: Second region
412: Second prism surface
4121: Third region
4122: Fourth region
42: Light emitting surface
43: Prism row formation plane
5: Light reflecting element
6: Light diffusing element
[Key to FIG. 10 (from top to bottom):]
  LUMINOSITY (RELATIVE VALUE)
  ANGLE (°)
[Key to FIG. 12 (from top to bottom):]
  LUMINOSITY (RELATIVE VALUE)
  ANGLE (°)
[Key to FIG. 14 (from top to bottom):]
  LUMINOSITY (RELATIVE VALUE)
  ANGLE (°)
[Key to FIG. 16 (from top to bottom):]
  LUMINOSITY (RELATIVE VALUE)
  ANGLE (°)
[Key to FIG. 18 (from top to bottom):]
  LUMINOSITY (RELATIVE VALUE)
  ANGLE (°)

The invention claimed is:

1. A light source device comprising: a light conductor which has a first light incident end surface and a second light incident end surface that extend in substantially parallel directions relative to each other and that are positioned on mutually opposite sides, and a light emitting surface; a first primary light source and a second primary light source which are disposed respectively adjacent to said first light incident end surface and said second light incident end surface; and a light deflecting element which has a light incident surface disposed facing said light emitting surface and a light emitting surface positioned on the side opposite from this light incident surface, wherein
  a directional light emitting functional part with an average inclination angle of 0.5 to 15° is formed on at least one surface of said light conductor, i.e., the light emitting surface or the back surface positioned on the side opposite from this light emitting surface,
  a plurality of mutually parallel prism rows that extend in a direction substantially parallel to said first light incident end surface and said second light incident end surface are formed on the light incident surface of said light deflecting element, each of these prism rows has a first prism surface on the side close to said first primary light source and a second prism surface on the side close to said second primary light source,
  said first prism surface has a first region that extends in the direction of extension of said prism rows and a second region that extends in the direction of extension of said prism rows,
  the vertical angle of the prism rows is 80 to 120°, the difference in the angle of inclination between said first region and said second region is 5 to 20°, and said second region has a smaller angle of inclination with respect to the normal direction of the prism row formation plane than said first region.

2. The light source device according to claim 1, wherein said second region is positioned further from the top part of said prism rows than said first region.

3. The light source device according to claim 1, wherein the ratio of the width of said second region to the width of said prism rows in the cross section perpendicular to the direction of extension of said prism rows is 10 to 40%.

4. The light source device according to claim 1, wherein at least one surface among said first region, said second region and said second prism surface consists of a single plane or curved surface.

5. The light source device according to claim 1, wherein said first region deflects (by inside surface reflection) the light that is emitted from said light emitting surface and introduced into said prism rows from said second prism surface in the direction forming the first angle with respect to the normal direction of said prism row formation plane, said second region deflects (by inside surface reflection) the light that is emitted from said light emitting surface and introduced into said prism rows from said second prism surface in the normal direction of said prism row formation plane or in a direction in the vicinity of this normal direction, and said second prism surface deflects (by inside surface reflection) at least the light that is emitted from said light emitting surface and introduced into said prism rows from said first prism surface in the direction forming the second angle with respect to the normal direction of said prism row formation plane.

6. The light source device according to claim 5, wherein said second angle is positioned on the opposite side of the normal direction of said prism row formation plane from said first angle.

7. The light source device according to claim 5, wherein the direction forming said second angle is said normal direction or a direction in the vicinity of said normal direction.

8. The light source device according to claim 1, wherein said second prism surface has a third region extending in the direction of extension of said prism rows and a fourth region extending in the direction of extension of said prism rows, the difference in the angle of inclination between said third region and said fourth region is 5 to 20°, and said fourth region has a smaller inclination angle with respect to the normal direction of the prism row formation plane than said third region.

9. The light source device according to claim 8, wherein said fourth region is positioned further from the top part of said prism rows than said third region.

10. The light source device according to claim 8, wherein the ratio of the total of the width of said second region and the width of said fourth region to the width of said prism rows in the cross section perpendicular to the direction of extension of said prism rows is 10 to 40%.

11. The light source device according to claim 8, wherein at least one region among said first region, said second region, said third region and said fourth region consists of a single plane or curved surface.

12. The light source device according to claim 8, wherein said first region deflects (by inside surface reflection) the light that is emitted from said light emitting surface and introduced into said prism rows from said second prism surface in the direction forming the first angle with respect to the normal direction of said prism row formation plane, said second region deflects (by inside surface reflection) the light that is emitted from said light emitting surface and introduced into said prism rows from said second prism surface in the normal direction of said prism row formation plane or in a direction in the vicinity of this normal direction, and said second prism surface deflects (by inside surface reflection) at least the light that is emitted from said light emitting surface and introduced into said prism rows from said first prism surface in the direction forming the second angle with respect to the normal direction of said prism row formation plane.

13. The light source device according to claim 12, wherein said second angle is positioned on the opposite side of the normal direction of said prism row formation plane from said first angle.

14. The light source device according to claim 12, wherein the direction forming said second angle is said normal direction or a direction in the vicinity of this normal direction.

15. The light source device according to claim 12, wherein said third region deflects (by inside surface reflection) the light that is emitted from said light emitting surface and introduced into said prism rows from said first prism surface in the direction forming the second angle with respect to the normal direction of said prism row formation plane, and said fourth region deflects (by inside surface reflection) the light that is emitted from said light emitting surface and introduced into said prism rows from said first prism surface in the normal direction of said prism row formation plane or in a direction in the vicinity of this normal direction.

16. The light source device according to claim 15, wherein said second angle is positioned on the opposite side of the normal direction of said prism row formation plane from said first angle.

17. The light source device according to claim 15, wherein the direction forming said second angle is said normal direction or a direction in the vicinity of this normal direction.

18. The light source device according to any of claims 1 through 17, wherein said light conductor causes the emission of light in at least two directions, both with peak light in the luminosity distribution of the emitted light from the light emitting surface having full widths at half maximum of 10 to 50° in directions of 50 to 80° on mutually opposite sides with respect to the normal of the light emitting surface.

19. A light source device comprising: a light conductor which has a light incident end surface that is one of two end surfaces extending in substantially parallel directions relative to each other and positioned on mutually opposite sides, and a light emitting surface; a primary light source which is disposed adjacent to said light incident end surface; and a light deflecting element which has a light incident surface disposed facing said light emitting surface and a light emitting surface positioned on the side opposite from this light incident surface, wherein
 a directional light emitting functional part with an average inclination angle of 0.5 to 15° is formed on at least one surface of said light conductor, i.e., the light emitting surface or the back surface positioned on the side opposite from this light emitting surface,
 a plurality of mutually parallel prism rows that extend in a direction substantially parallel to said light incident end surface are formed on the light incident surface of the light deflecting element, each of these prism rows has a first prism surface on the side close to said primary light source and a second prism surface on the side distant from said primary light source,
 said first prism surface has a first region which extends in the direction of extension of said prism rows and a second region which extends in the direction of extension of said prism rows,
 the vertical angle of the prism rows is 50 to 90°, the difference in the angle of inclination between said first region and said second region is 10 to 25°, and said second region has a smaller angle of inclination with respect to the normal direction of the prism row formation plane than said first region.

20. The light source device according to claim 19, wherein said second region is positioned further from the top part of said prism rows than said first region.

21. The light source device according to claim 19, wherein at least one surface among said first region, said second region and said second prism surface consists of a single plane or curved surface.

22. The light source device according to claim 19, wherein said first region deflects (by inside surface reflection) the light that is emitted from said light emitting surface and introduced into said prism rows from said second prism surface in the direction forming the first angle with respect to the normal direction of said prism row formation plane, and said second region deflects (by inside surface reflection) the light that is emitted from said light emitting surface and introduced into said prism rows from said second prism surface in the normal direction of said prism row formation plane or in a direction in the vicinity of this normal direction.

23. The light source device according to claim 22, wherein said second angle is positioned on the opposite side of the normal direction of said prism row formation plane from said first angle.

24. The light source device according to claim 19, wherein a fifth region is present between said first region and second region.

25. The light source device according to claim 24, wherein the inclination angle of said fifth region is smaller than the inclination angle of the first region, but larger than the inclination angle of the second region.

26. The light source device according to claim 25, wherein the ratio of the width of said fifth region to the width of said prism rows in the cross section perpendicular to the direction of extension of said prism rows is 10 to 40%.

27. The light source device according to claim 25, wherein said first region deflects (by inside surface reflection) the light that is emitted from said light emitting surface and introduced into said prism rows from said second prism surface in the direction forming the first angle with respect to the normal direction of said prism row formation plane, said second region deflects (by inside surface reflection) the light that is emitted from said light emitting surface and introduced into said prism rows from said second prism surface in the normal direction of said prism row formation plane or in a direction in the vicinity of this normal direction, and said fifth region deflects (by inside surface reflection) the light that is emitted from said light emitting surface and introduced into said prism rows from said second prism surface in the normal direction of said prism row formation plane or in a direction in the vicinity of this normal direction.

28. The light deflecting element according to any of claims 1 through 27.

* * * * *